United States Patent
Cahill-O'Brien et al.

(10) Patent No.: US 11,234,137 B2
(45) Date of Patent: *Jan. 25, 2022

(54) LOW LATENCY HYBRID NETWORK FOR BATTERY POWERED ENDPOINT COMMUNICATIONS

(71) Applicant: Itron, Inc., Liberty Lake, WA (US)

(72) Inventors: Barry Cahill-O'Brien, Spokane, WA (US); Bruce Edwards, San Jose, CA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,577

(22) Filed: Oct. 12, 2018

(65) Prior Publication Data

US 2020/0120513 A1 Apr. 16, 2020

(51) Int. Cl.
*H04W 4/00* (2018.01)
*H04W 16/24* (2009.01)
*H04L 1/18* (2006.01)
*H04W 40/04* (2009.01)

(52) U.S. Cl.
CPC .......... *H04W 16/24* (2013.01); *H04L 1/1812* (2013.01); *H04W 40/04* (2013.01)

(58) Field of Classification Search
None
See application file for complete search history.

(56) References Cited

U.S. PATENT DOCUMENTS

| 5,594,740 | A | * | 1/1997 | LaDue | G07C 9/00111 340/870.02 |
|---|---|---|---|---|---|
| 6,088,659 | A | * | 7/2000 | Kelley | G06F 16/258 702/62 |
| 2007/0025364 | A1 | | 2/2007 | Kodialam et al. | |
| 2008/0068994 | A1 | * | 3/2008 | Garrison Stuber | G01D 4/004 370/230 |
| 2010/0188260 | A1 | * | 7/2010 | Cornwall | G01D 4/006 340/870.02 |
| 2012/0062389 | A1 | * | 3/2012 | Solomon | H04Q 9/00 340/870.03 |

(Continued)

OTHER PUBLICATIONS

International Search Report for application No. PCT/US2019/055728 dated Jan. 2, 2020.

(Continued)

*Primary Examiner* — Jinsong Hu
*Assistant Examiner* — Alexander J Yi
(74) *Attorney, Agent, or Firm* — Artegis Law Group, LLP

(57) ABSTRACT

Nodes included in a hybrid network establish cellular links infrequently and at staggered intervals. When a node establishes a cellular link, other nodes can transmit and receive data to a back office using that cellular link. In addition, the node can receive a request from the back office across the cellular link indicating that another node should respond to an on-demand read request. The node can then signal the other node via a wireless mesh network to establish a cellular link in order to respond to the on-demand read request. An advantage of the disclosed approach is that a battery powered node can communicate as often as needed with the back office without frequently establishing a cellular link and without maintaining a continuously active cellular link.

21 Claims, 12 Drawing Sheets

(56) References Cited

U.S. PATENT DOCUMENTS

| | | |
|---|---|---|
| 2012/0275343 A1* | 11/2012 | Shorty .................... H04L 12/10 |
| | | 370/255 |
| 2013/0155880 A1 | 6/2013 | Hughes et al. |
| 2013/0165104 A1 | 6/2013 | Flammer, III |
| 2013/0322418 A1 | 12/2013 | Ho et al. |
| 2014/0281624 A1 | 9/2014 | Cahill-O'Brien et al. |
| 2016/0011007 A1* | 1/2016 | Gopinath ............... G01D 4/004 |
| | | 340/870.02 |
| 2017/0299725 A1 | 10/2017 | Bitra et al. |
| 2017/0367029 A1 | 12/2017 | Alexander et al. |
| 2018/0167224 A1 | 6/2018 | Brandt |
| 2018/0295583 A1 | 10/2018 | Cornwall et al. |

OTHER PUBLICATIONS

Final Office Action received for U.S. Appl. No. 16/159,587, dated Jul. 21, 2020, 23 pages.

Non-Final Office Action received for U.S. Appl. No. 16/159,587, dated Jan. 24, 2020, 16 pages.

* cited by examiner

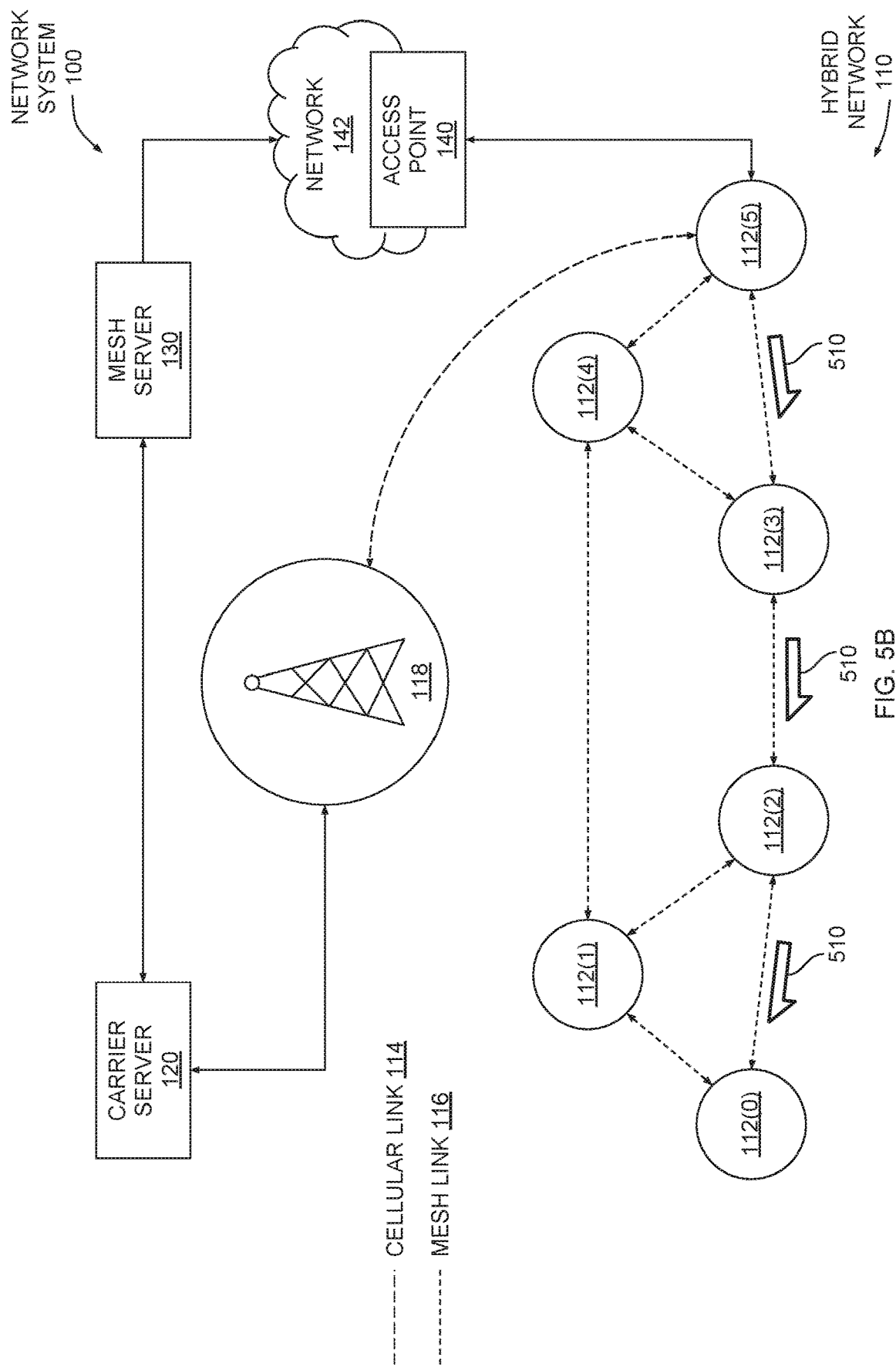

LOW LATENCY HYBRID NETWORK FOR BATTERY POWERED ENDPOINT COMMUNICATIONS

BACKGROUND OF THE INVENTION

Field of the Invention

Embodiments of the present invention relate generally to wireless network communications and, more specifically, to a low latency hybrid network for battery powered endpoint communications.

Description of the Related Art

A conventional utility distribution infrastructure typically includes multiple consumers, such as houses, business, and so forth, coupled to a set of intermediate distribution entities. The set of distribution entities draws resources from upstream providers and distributes the resources to the downstream consumers. In a modern utility distribution infrastructure, the consumers as well as the intermediate distribution entities, may include Internet-of-Things (IoT) devices, such as smart utility meters and other network-capable hardware. These IoT devices measure resource consumption to generate related metrology data. The IoT devices periodically report the metrology data across the Internet or other network to a centralized management facility, often referred to as the "back office."

In many cases, the back office performs various management operations for the utility distribution infrastructure on behalf of one or more customers. A given customer could be, for example, a utility company or another corporate entity that owns and/or operates all of or part of the utility distribution infrastructure. Typically, the back office periodically collects metrology data associated with the utility distribution infrastructure and provides that data to customers. For example, the back office could obtain metrology data from a set of IoT devices every eight hours indicating utility consumption over an eight-hour interval. The back office also occasionally initiates on-demand read requests to read metrology data from one or more specific IoT device at the behest of the customer. For example, the customer could need a final utility meter reading from a particular smart utility meter located at a recently sold residence in order to prorate a utility bill. The back office would transmit an on-demand read request to that smart meter to cause the smart meter to report the current meter reading.

Some types of IoT devices are designed to establish communication links and connect to the Internet or other network via cellular modems that communicate via a cellular network. For example, a given IoT device could be configured with a narrow-band IoT (NB-IoT) modem that couples to a cellular network according to an NB-IoT protocol. The NB-IoT modem allows the given IoT device to establish a cellular link with a nearby cellular tower and then access the Internet or other network via that cellular tower. One benefit of communicating over cellular links, especially those implemented via the NB-IoT protocol, is that IoT devices can quickly connect to the Internet or other network. Another benefit is that cellular links allow IoT devices to perform secure, Internet protocol (IP) based communications. For these reasons, customers oftentimes prefer that IoT devices communicate with the back office via cellular links instead of other communications channels. Among other things, cellular links allow IoT devices to report metrology data more frequently and back offices to perform on-demand read requests with IoT devices with relatively low latency.

One drawback of the above approach is that establishing and maintaining a cellular link typically consumes a good deal of power. Therefore, battery powered IoT devices cannot communicate via cellular links frequently without substantially reducing expected battery life. However, for a given IoT device to report metrology data regularly, in the manner described above, the IoT device would need to establish a cellular link quite often. Further, in order to permit the back office to perform on-demand read requests with a given IoT device, the IoT device would need to maintain an active cellular link at all times. Battery powered IoT devices are usually designed with an expected battery life of at least 15 years; but establishing frequent cellular links and/or maintaining an active cellular link at all times can reduce expected batter life to one year or less. When the depleted batteries in a battery powered IoT device need to be changed, a truck has to be dispatched, and a service person has to replace the depleted batteries manually, which can substantially increase operating overhead.

As the foregoing illustrates, what is needed in the art are more effective ways to communicate with battery powered devices within a network.

SUMMARY OF THE INVENTION

One embodiment of the present invention sets forth a computer-implemented method for servicing read requests within a hybrid network, including receiving a first read request from a first server via a first communication link, wherein the first communication link comprises a first type of communication link, determining that the first read request is directed to a first node included in the hybrid network, generating a second communication link that couples the first node to a second node also included in the hybrid network, wherein the second communication link comprises a second type of communication link, and transmitting the first read request to the first node via the second communication link to allow the first node to service the first read request.

At least one technological advantage of the disclosed techniques relative to the prior art is that a battery powered node can communicate with the back office as often as needed without having to establish a cellular link frequently or having to maintain a continuously active cellular link. The battery powered node thus conserves battery power and can operate for extended periods of time without needing replacement batteries.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5C illustrate how the nodes of FIG. 1 interoperate to process an on-demand read request, according to various embodiments of the present invention.

DETAILED DESCRIPTION

Figure 1:
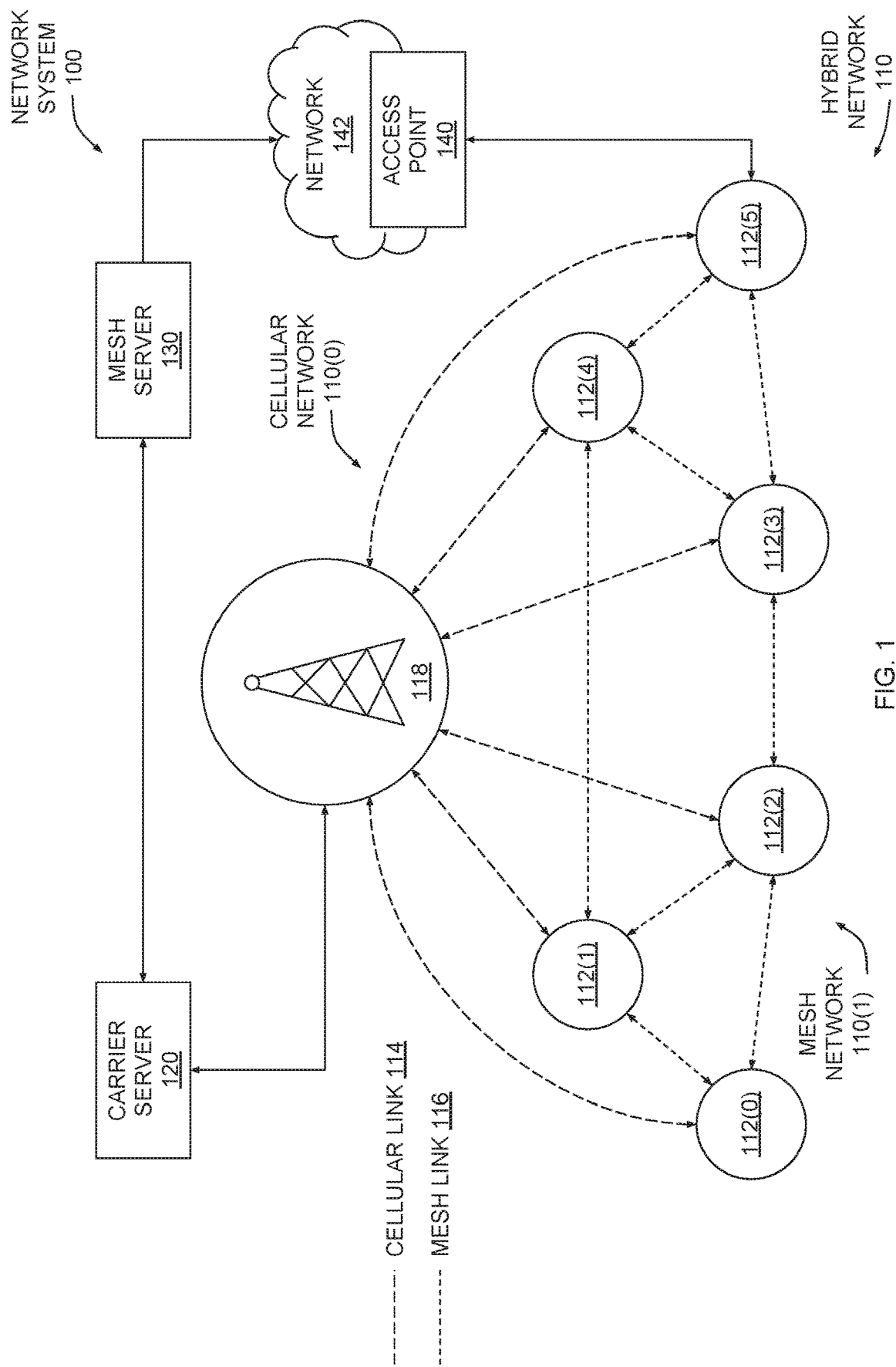
FIG. 1 illustrates a network system configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As discussed above, conventional battery powered IoT devices cannot be configured to communicate via cellular links very often without drastically reducing expected battery life below acceptable levels. In particular, battery powered IoT devices cannot report metrology via cellular links as often as is needed without consuming excessive battery power. In addition, battery powered IoT devices cannot respond to on-demand read requests via an active cellular link because maintaining an active cellular link consumes excessive battery power. Consuming excessive battery power can reduce the operational lifetime of the IoT device from 15 years or more to one year or less. When the batteries in the IoT device are depleted, a truck must be dispatched to replace the depleted batteries, thereby increasing overhead and other operating costs.

To address these issues, embodiments of the invention include a plurality of low power or battery-powered nodes included in a hybrid network. The plurality of nodes establishes cellular links with a cellular network only intermittently in order to conserve power. The plurality of nodes establishes low power mesh links with one another to form a low power wireless mesh network. Each node can communicate simple command messages to other nodes included in the low power wireless mesh network with low latency and reduced power expenditure. The low power mesh links need not be secured when used to transmit simple command messages, thereby conserving power. Each node can also communicate, on an as-needed basis, with a back office that manages the hybrid network across a secure, IP-based cellular link.

Nodes included in the hybrid network establish cellular links infrequently and at staggered intervals. When a given node establishes a cellular link, other nodes can transmit and receive data to the back office using that cellular link. In particular, the given node can accumulate metrology data from the other nodes across the low power wireless mesh network and then report this metrology data to the back office across the cellular network. In addition, the given node can receive a request from the back office across the cellular link indicating that another node should respond to an on-demand read request. The given node can then transmit a simple command message to the other node via the wireless mesh network, causing the other node to establish a cellular link for responding to the on-demand read request.

One technological advantage of the disclosed approach is that a battery powered node can communicate as often as needed with the back office without establishing a cellular link very regularly or maintaining a continuously active cellular link. The battery powered node thus conserves a great deal of battery power and therefore can operate for extended periods of time without needing replacement batteries. Because the disclosed approach reduces overhead while providing nodes with the ability to communicate with the back office securely and with low latency, the disclosed approach represents multiple technological advancements compared to prior art techniques.

System Overview

FIG. 1 illustrates a network system configured to implement one or more aspects of the present invention. As shown, a network system 100 includes a hybrid network 110, a carrier server 120, a mesh server 130, and an access point 140. Hybrid network 110 includes a plurality of nodes 112 and a cellular tower 118. Each node 112 is configured to establish a cellular link 114 to cellular tower 118, thereby forming a cellular network 110(0) within hybrid network 110. Carrier server 120 generally facilitates communications performed across cellular network 110(0) via cellular tower 118. Each node 112 is also configured to establish one or more mesh links 116 with one or more neighboring nodes 112, thereby forming a mesh network 110(1) within hybrid network 110. Mesh server 130 generally coordinates mesh network 110(1) via access point 140.

Nodes 112 can be powered by an external power source, such as a power grid, powered by an internal power source, such as batteries, or solar powered. As a general matter, though, nodes 112 operate with low power and therefore perform specific operations to conserve power expenditure. A given node 112 can operate as a source node, an intermediate node, and a destination node. When operating as a source node, the given node 112 generates and then transmits data across cellular network 110(0) and/or mesh network 110(1). When operating as an intermediate node, the given node 112 receives data transmitted by a neighboring node via cellular network 110(0) and/or mesh network 110(1) and then re-transmits the data across cellular network 110(0) and/or mesh network 110(1), When operating as a destination node, the given node 112 receives data transmitted across cellular network 110(0) and/or mesh network 110(1).

Nodes 112 operate according to a cellular communication protocol in order to establish and maintain cellular links 114 with cellular tower 118. In one embodiment, the cellular communication protocol may be the narrow-band Internet-of-Things (NB-IoT) protocol. A given node 112 establishes a cellular link using a cellular modem, as described below in greater detail in conjunction with FIG. 2A. In so doing, the given node 112 transmits identifying information included in a subscriber identification module (SIM) card to carrier server 120 via cellular tower 118. In response, carrier server 120 authorizes the given node 112 to establish a cellular link 114 with cellular tower 118. Carrier server 120 then coordinates communications between the given node 112 and mesh server 130.

Nodes 112 implement a discovery protocol to identify and establish mesh links 116 with one or more adjacent nodes. For example, node 112(1) may implement the discovery protocol to identify nodes 112(0), 112(2), and 112(4) and establish communications with those nodes. When a given node 112 discovers another node 112, those nodes exchange media access control (MAC) addresses and then schedule future communications with one another based on those MAC addresses. Mesh server 130 generally configures each node 112 to implement the discovery protocol. Mesh server 130 also configures each node 112 with authentication credentials that allow nodes 112 to establish cellular links 114 and/or secure mesh links 116 with one another. Mesh links 116 are generally wireless, radio frequency (RF) communication links.

In one embodiment, nodes 112 may implement the discovery protocol to determine the hopping sequences of adjacent nodes. The hopping sequence of a node is the sequence of channels across which the node periodically receives data. As is known in the art, a channel may correspond to a particular range of frequencies. Once adjacency is established between nodes 112, any of those nodes 112 can communicate with any of the other nodes 112 via one or more intermediate nodes 112 in the manner described above. Data communicated between nodes 112 may include an Internet protocol (IP) packet, a short command message, metrology data, or any other technically feasible unit of data. Any technically feasible addressing and forwarding techniques may be implemented to facilitate delivery of the data from a source node to a destination node. For example, the data may include a header field configured to include a destination address, such as an IP address or media access control (MAC) address.

Each node 112 can be configured to forward received data based on a destination address. A given node 112 can also forward data based on a header field that includes at least one switch label defining a predetermined path from a source node to a destination node. Nodes 112 maintain a forwarding database that indicates which mesh link 116 should be used and in what priority for transmitting data to a destination node. The forwarding database describes routes to a destination node and cost values associated with those routes. Any technically feasible type of cost value can be implemented to characterize a link or a route within the mesh network 110(1).

In network system 100, access point 140 is configured to communicate with at least one node within mesh network 110(1) and to also communicate with mesh server 130 via network 142. Communication may include transmission of payload data, timing data, authentication credentials, network configuration data, or any other technically relevant data generated by mesh server 130 and destined for one or more nodes 112. Network 142 includes any technically feasible wired, optical, wireless, or hybrid network configured to transmit data between mesh server 130 and access point 140.

Mesh server 130 represents a destination for data generated by nodes 112. Nodes 112 generally transmit this data to mesh server 130 via cellular network 110(0) for security and reduced latency. For example, nodes 112 could generate metrology data, such as electricity consumption data, and then transmit the metrology data to mesh server 130 across cellular links 114. Mesh server 130 can query nodes 112 to obtain various data in an on-demand manner. For example, mesh server 130 can issue on-demand read requests across cellular links 114 to cause nodes 112 to report metrology data back to mesh server 130.

Nodes 112 establish cellular links 114 periodically and at different times according to a communication schedule defined by mesh server 130. For example, each node 112 could be scheduled to establish a different cellular link 114 at a different hour of any given day. Accordingly, under ordinary operating conditions, only one or only a subset of cellular links 114 are active at any given time. Nodes 112 can establish and maintain mesh links 116 on an ongoing basis as needed to allow nodes 112 to exchange data with one another at any time and with low latency. Nodes 112 can also activate mesh links 116 just prior to when a given node 112 establishes a cellular link 114.

When reporting metrology data in the manner described above, nodes 112 transmit the metrology data across mesh network 110(1) to a designated node 112 that is scheduled to subsequently establish a cellular link 114. The designated node 112 accumulates the metrology data from some or all other nodes 112 and establishes a cellular link 114 at the scheduled time. The designated node 112 then transmits the accumulated metrology data to mesh server 130 across the cellular link 114. Any given node 112 that is scheduled to subsequently establish a cellular link 114 can subsequently operate as the designated node. This approach is described in greater detail below in conjunction with FIGS. 3A-4.

When a designated node 112 establishes a cellular link 114, that node can also receive on-demand read requests from mesh server 130 across the cellular link 114. Those on-remand read requests can target any of nodes 112. The designated node 112 distributes on-demand read requests to targeted nodes 112 via mesh network 110(1). Upon receipt of an on-demand read-request, a receiving node 112 establishes a cellular link 114 to service the on-demand read requests. In doing so, the receiving node 112 may report up-to-date metrology data to mesh server 130. This approach is described in greater detail below in conjunction with FIGS. 5A-6.

As a general matter, nodes 112 included in hybrid network 110 perform communications across both cellular network 110(0) and mesh network 110(1) in the manner described in order to reduce the number of cellular links 114 that need to be established and maintained at any given time. Specifically, by sharing a single cellular link 114 established by one node 112, the other nodes can avoid establishing a separate cellular link 114. This approach reduces the energy that needs to be expended by nodes 112 when communicating with mesh server 130. Importantly, nodes 112 that are powered by batteries advantageously implement the techniques described herein to reduce energy consumption and extend battery life. For example, under some conditions, a battery powered node 112 that establishes a cellular link 114 only once per day can operate for 15 years or more without needing replacement batteries. Accordingly, the disclosed techniques represent a significant technological advancement over conventional approaches where battery powered nodes establish and/or maintain separate cellular links, thereby consuming excessive power.

The techniques described herein are sufficiently flexible to be utilized with any technically feasible combination of networks beyond cellular networks and mesh networks. For example, hybrid network 110 could include a satellite network configured to facilitate global communications with an elevated energy expenditure, as well as a local WiFi network configured to facilitate local communications with reduced energy expenditure. As a general matter, hybrid network 110 can include any two or more technically feasible networks across which nodes 112 can communicate.

Figure 2A:
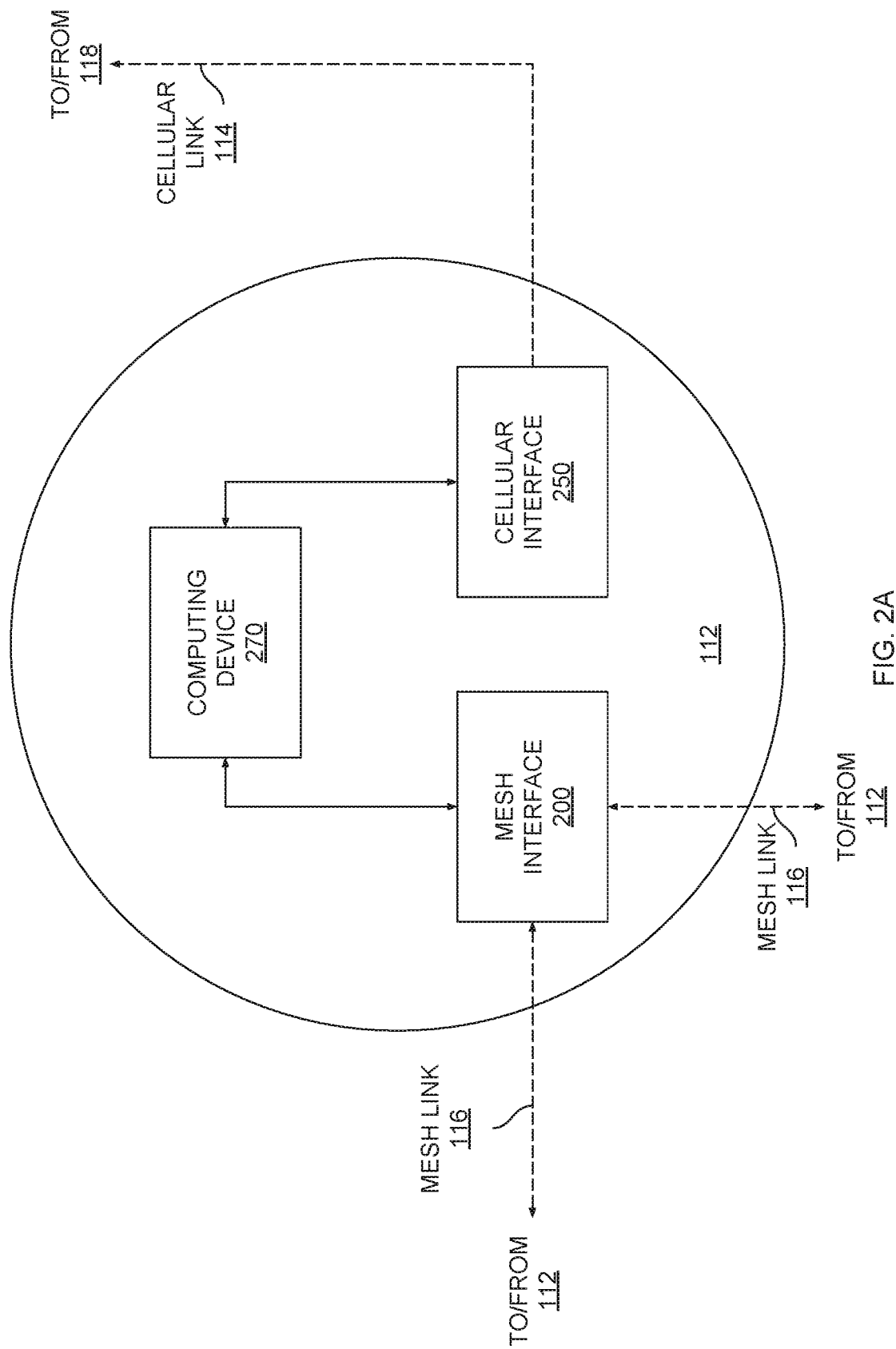
FIG. 2A is a more detailed illustration of a node of FIG. 1, according to various embodiments of the present invention.

FIG. 2A is a more detailed illustration of a node of FIG. 1, according to various embodiments of the present invention. As shown, node 112 includes a mesh interface 200, a cellular interface 250, and a computing device 270, coupled together.

Figure 2B:
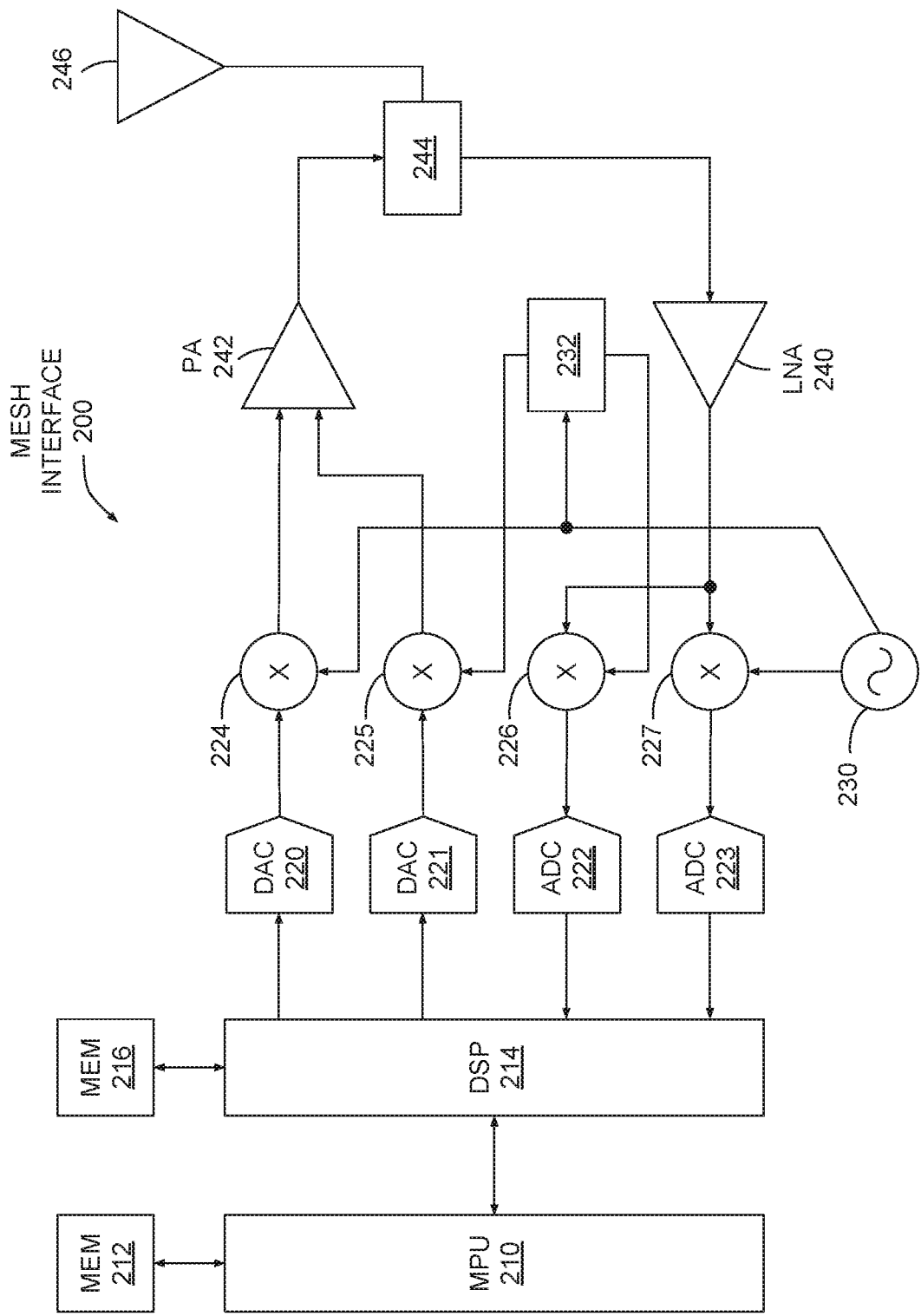
FIG. 2B is a more detailed illustration of the mesh interface of FIG. 2A, according to various embodiments of the present invention.

Mesh interface 200 is configured to establish one or more mesh links 116 with one or more adjacent nodes 112. Mesh interface 200 generally includes one or more radio transceivers configured to transmit and receive data packets. Mesh interface 200 can be configured to establish communications with adjacent nodes during the discovery process discussed above in conjunction with FIG. 1. FIG. 2B illustrate mesh interface 200 in greater detail.

Cellular interface 250 is configured to establish a cellular link 114 with cellular tower 118 in order to allow node 112 to communicate with mesh server 130 via carrier server 120. Cellular interface 250 includes a SIM card (not shown) that includes authentication credentials according to which carrier server 120 authenticates node 112 to communicate via cellular link 114. In one embodiment, cellular interface 250 is an NB-IoT modem. In another embodiment, cellular interface 250 is configured to establish local communications with other cellular interfaces 250 included in other nodes 112 in order to generate mesh network 110(1). In yet another embodiment, cellular interface 250 may consume an amount of power when generating and/or establishing a given cellular link 114 that is a multiple of the amount of power consumed by mesh interface 200 when generating and/or establishing a given mesh link 116.

Computing device 270 coordinates the operation of mesh interface 200 and cellular interface 250. Computing device 270 also operates as a bridge between mesh interface 200 and cellular interface 250, thereby allowing data that is received via one interface to be relayed across the other interface. When relaying data in this manner, computing device 270 can buffer received data for subsequent transmission. Mesh server 130 configures computing device 270 to implement any of the node operations discussed herein, including executing scheduled communications via cellular link 114. For example, mesh server 130 could configure computing device 270 with a communication schedule according to which computing device 270 would activate cellular interface 250 to establish cellular link 114.

As a general matter, computing device 270 causes mesh interface 200 to generate and/or establish mesh links 116 more frequently, or with a greater periodicity, compared to how frequently computing device 270 causes cellular interface 250 to generate and/or establish cellular links 114. For example, computing device 270 could cause mesh interface 200 to generate a mesh link 116 with a periodicity of once per 8-hour interval, and cause cellular interface 250 to generate a cellular link 114 with a periodicity of once per 24-hour period. Either or both of these periodicities can be defined within the communication schedule. In one embodiment, mesh server 130 generates the communication schedule based on current battery depletion levels of nodes 112. An exemplary computing device that can implement computing device 270 is described in greater detail below in conjunction with FIG. 2C.

FIG. 2B is a more detailed illustration of the mesh interface of FIG. 2A, according to various embodiments of the present invention. Each node 112 within the hybrid network 110 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. Oscillator 230 may be coupled to a clock circuit (not shown) configured to maintain an estimate of the current time. MPU 210 may be configured to update this time estimate, and other data associated with that time estimate, based on time synch beacons received from other nodes 112.

A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by mesh interface 200. The procedures for processing the IP packets may include, without limitation, wireless routing, encryption, authentication, protocol translation, and routing between and among different wireless and wired network ports. In one embodiment, MPU 210 implements the techniques performed by the node when MPU 210 executes a firmware program stored in memory within network interface 200.

DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or DSP 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or DSP 214 may buffer within memory 212 and/or memory 216 any portion of data received across the set of channels from which antenna 246 receives data, including all such data. MPU 210 and/or DSP 214 may then perform various operations with the buffered data, including demodulation operations, decoding operations, and so forth.

Persons having ordinary skill in the art will recognize that network interface 200 represents just one possible network interface that may be implemented within nodes 112 shown in FIG. 1, and that any other technically feasible device for transmitting and receiving data may be incorporated within any of those nodes.

Figure 2C:
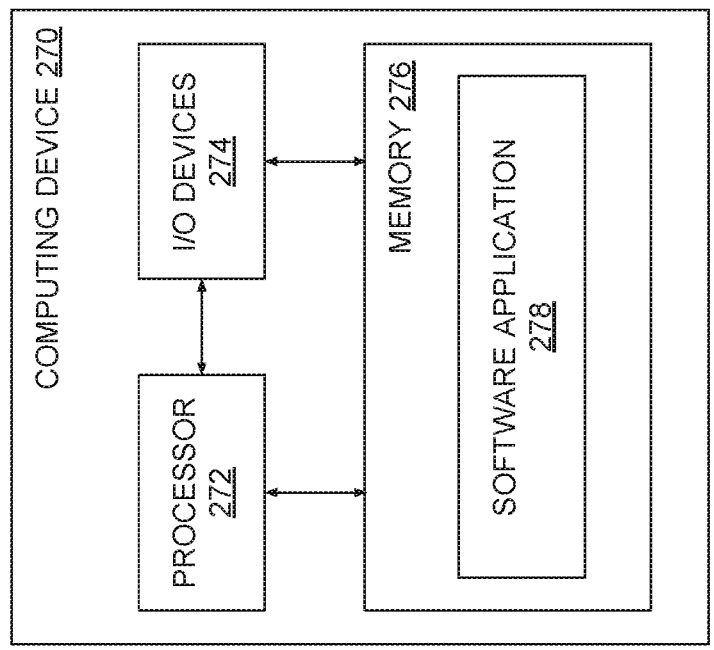
FIG. 2C is a more detailed illustration of the computing device of FIG. 2A, according to various embodiments of the present invention.

FIG. 2C is a more detailed illustration of the computing device of FIG. 2A, according to various embodiments of the present invention. As shown, computing device 270 includes a processor 272, input/output (I/O) devices 274, and memory 276, coupled together.

Processor 272 includes any technically feasible set of hardware units configured to process data and execute software applications. For example, processor 272 could include one or more central processing units (CPUs). I/O devices 274 include any technically feasible set of devices configured to perform input and/or output operations, including, for example, a universal serial bus (USB) port, among others. Memory 276 includes any technically feasible storage media configured to store data and software applications, such as, for example, a hard disk and/or a random-access memory (RAM) module, among others. Memory 276 includes a software application 278. Software application 278 includes a program code that, when executed by processor 272, performs any of the node-oriented operations discussed herein.

Aggregating Metrology Data for Transmission Across a Cellular Link

Figure 3A:
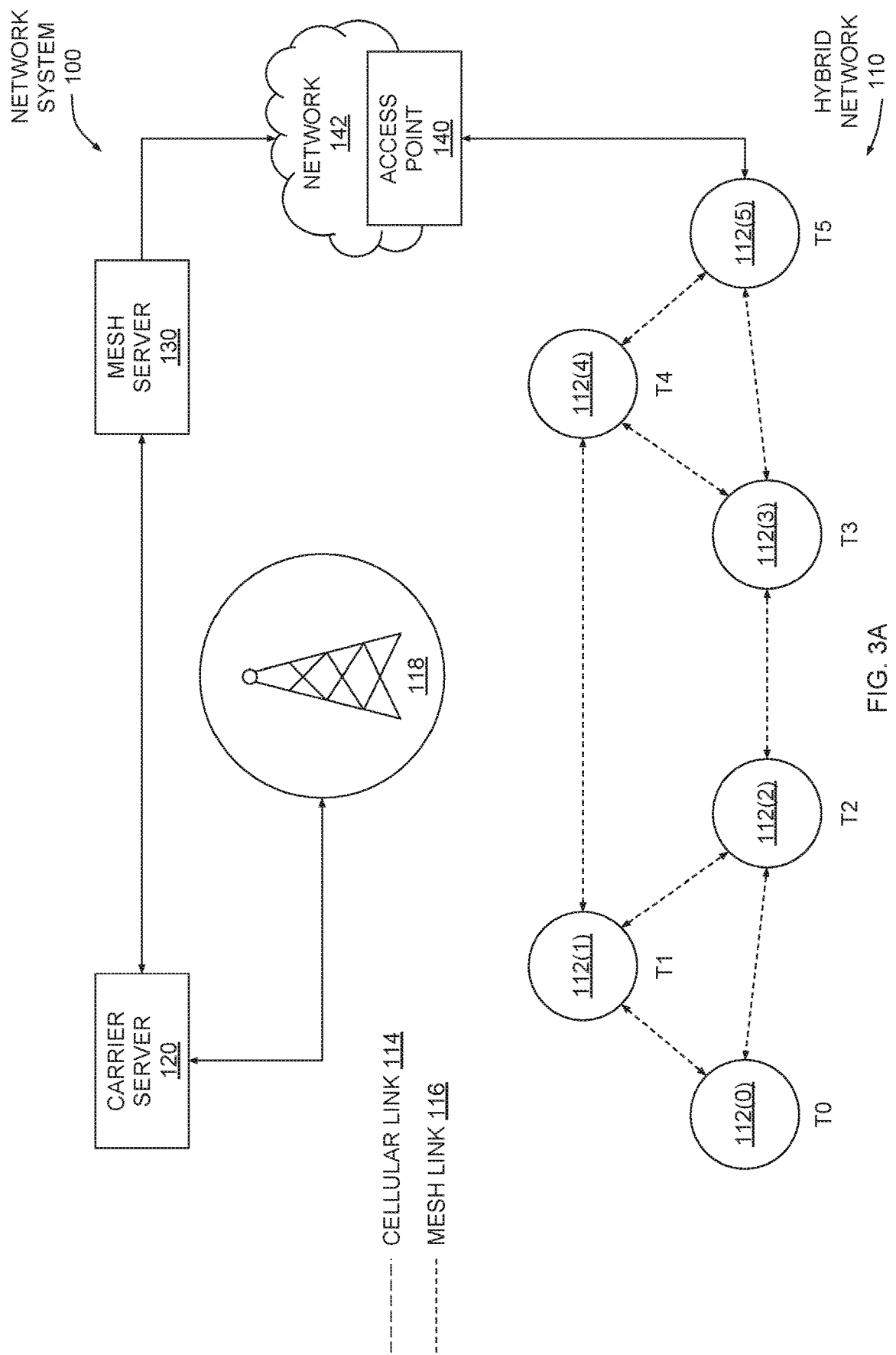
FIGS. 3A-3C illustrate how the nodes of FIG. 1 interoperate to transmit network data across a given cellular link, according to various embodiments of the present invention.
Figure 3B:
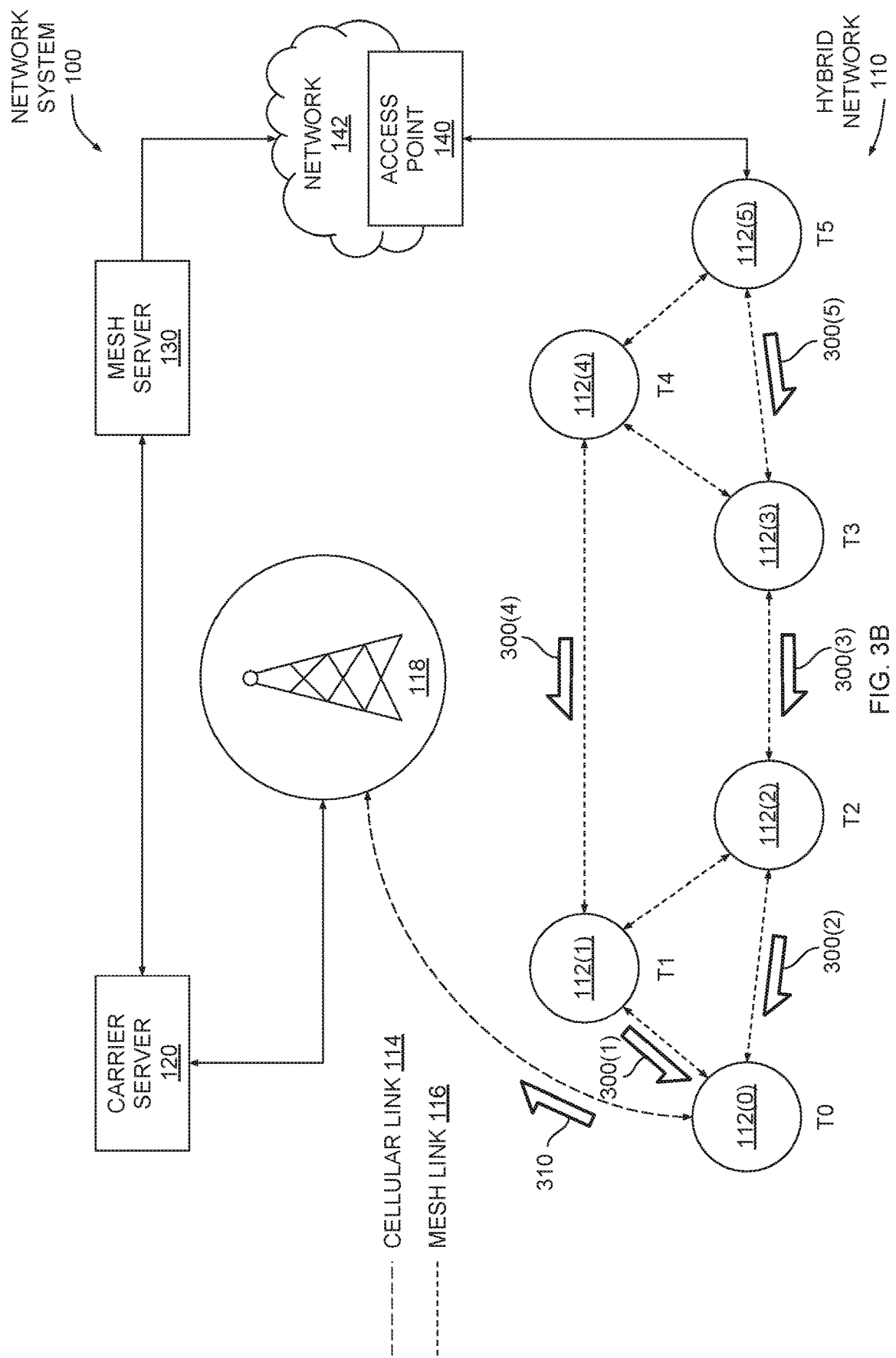
Figure 3C:
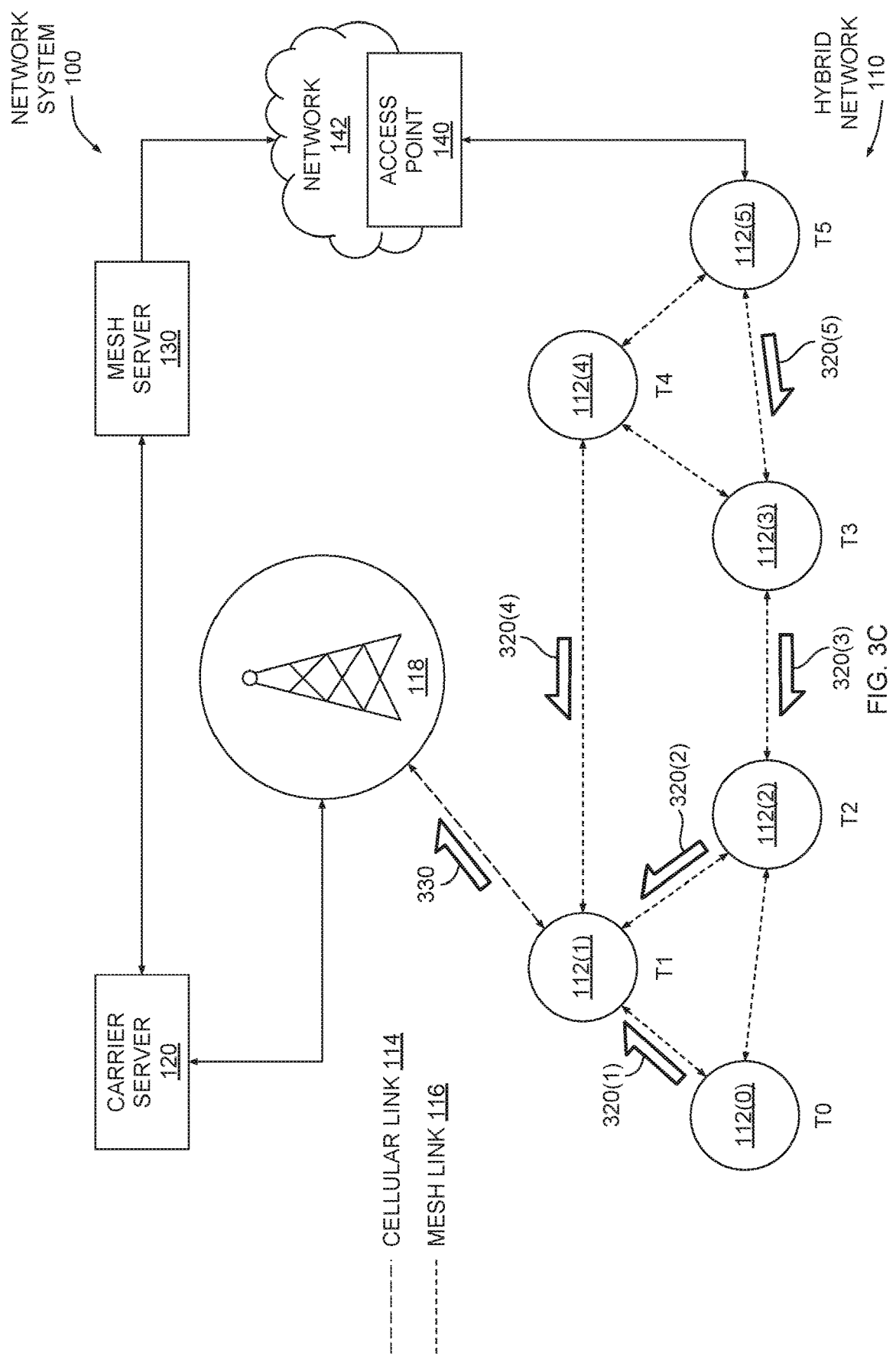

FIGS. 3A-3C illustrate how the nodes of FIG. 1 interoperate to transmit network data across a given cellular link, according to various embodiments of the present invention. As mentioned above in conjunction with FIG. 1, nodes 112 are configured to interoperate to share a single cellular link 114 in order to reduce the number of cellular links 114 that need to be established. Mesh server 130 configures nodes 112 to establish cellular links 114 at different times according to a communication schedule.

As shown in FIG. 3A, each of nodes 112 is associated with a different communication time T0 through T5. A given node 112 establishes a cellular link 114 at the corresponding communication time. Transmission times T0-T5 may be evenly distributed across a 24-hour period or distributed in any other technically feasible fashion. Nodes 112 are configured to analyze the communication schedule in order to determine when a subsequent transmission time occurs and which node 112 is designated to establish cellular link 114 at that time. Nodes 112 can then transmit any metrology data to the designated node 112 for subsequent transmission across cellular link 114, as described by way of example below in conjunction with FIG. 3B.

Referring now to FIG. 3B, node 112(0) accumulates metrology data 300 from nodes 112(1)-112(5) prior to time T0. In one embodiment, nodes 112(1)-112(5) transmit metrology data 300 within a threshold time span of time T0. When time T0 arrives, node 112(0) establishes cellular link 114 and then uploads bulk metrology data 310 across cellular link 114 to carrier server 120. Bulk metrology data 310 could be, for example, a compressed form of accumulated metrology data 300. Carrier server 120 provides this data to mesh server 130 or any third-party consumers of such metrology data. Node 112(0) generally keeps cellular link 114 active for a configurable amount of time, but typically limits that time to prevent unnecessary energy expenditure. Another node 112 can perform the above process at a subsequent time, as described by way of example below in conjunction with FIG. 3C.

Referring now to FIG. 3C, node 112(1) accumulates metrology data 320 from nodes 112(1) and 112(2)-112(5) prior to time T1. When time T1 arrives, node 112(1) establishes cellular link 114 and then uploads bulk metrology data 330 across cellular link 114 to carrier server 120. Node 112(1) subsequently terminates cellular link 114. According to these techniques, nodes 112 interoperate to generate communication pathways that span hybrid network 110 and include both cellular links 114 and mesh links 116.

In one embodiment, the regularity with which any given node 112 needs to establish a cellular link 114 may depend inversely on the number of nodes 112 included in hybrid network 110. For example, with 24 nodes, each node 112 could establish a cellular link 114 once per 24-hour period. In this example, mesh server 130 would acquire metrology data from nodes 112 at one-hour intervals. However, increasing the number of nodes to 48 would reduce the regularity with which each node needs to establish a cellular link 114 to once per 48-hour period without changing how often mesh server 130 acquires metrology data. In another embodiment, mesh server 130 configures nodes 112 to establish cellular links 114 with a regularity that is independent of how often the mesh server 130 needs to acquire bulk metrology data.

Under some circumstances, a given node 112 may be unable to establish a cellular link 114. A neighboring node 112 can mitigate these circumstances by performing any scheduled communications on behalf of the given node 112. With any of the described techniques, nodes 112 can transmit data to one another over unsecured mesh links 116, although nodes 112 can also establish secure IP-based mesh links 116 with one another in order to support the secure exchange of any sensitive information.

As a general matter, the disclosed techniques advantageously scales in manner that allows nodes 112 to communicate with mesh server 130 very frequently without needing any specific node 112 to frequently establish a cellular link 114. Accordingly, each node 112 can conserve a great deal of battery power and therefore operate for extended periods of time without needing replacement batteries. In addition, the disclosed techniques can be adapted to provide metrology data to mesh server 130 with any desired frequency without significantly impacting expected battery lifetime of nodes 112.

Figure 4:
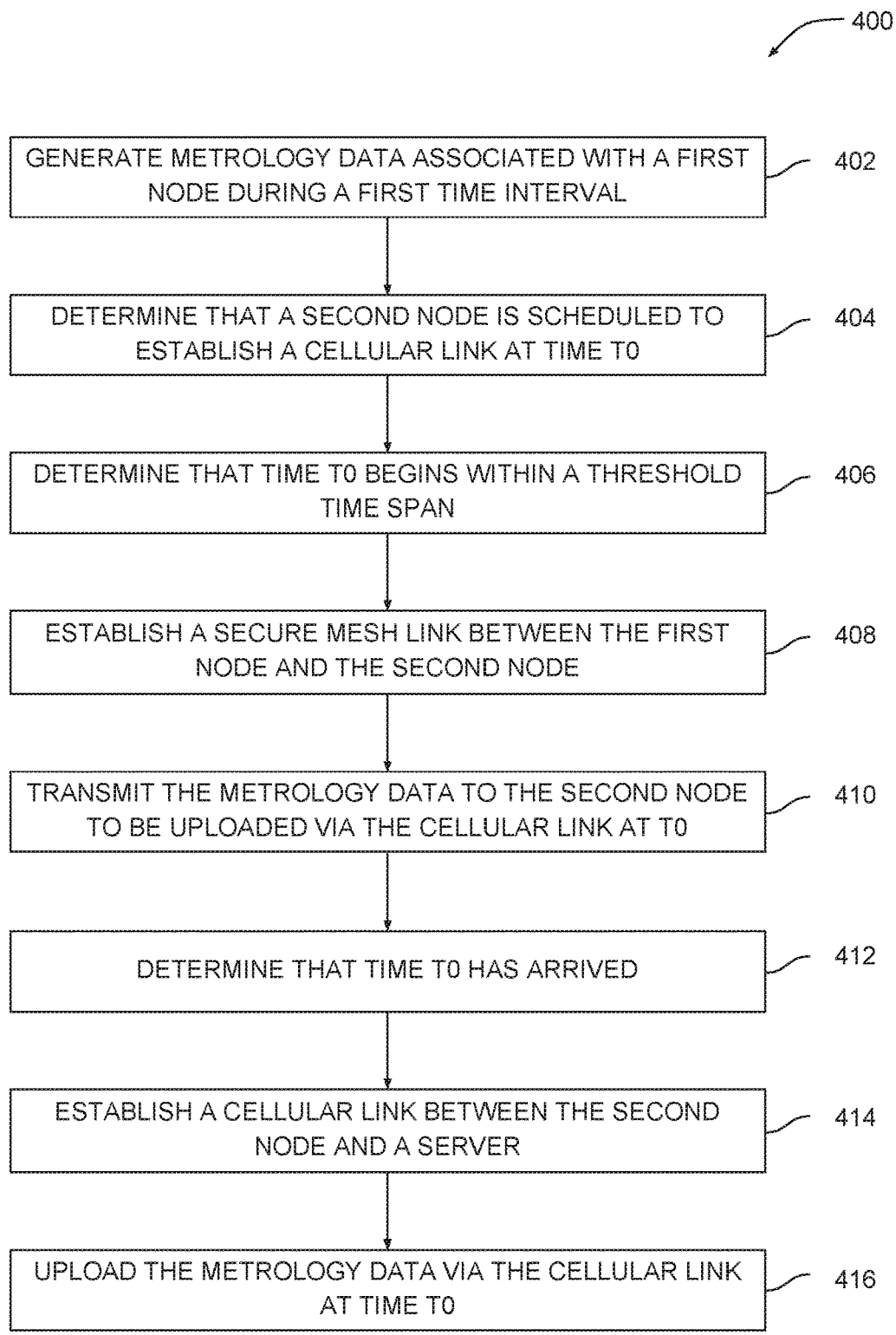
FIG. 4 is a flow diagram of method steps for causing a node to transmit network data across a cellular link on behalf of one or more other nodes, according to various embodiments of the present invention.

FIG. 4 is a flow diagram of method steps for causing a node to transmit network data across a cellular link on behalf of one or more other nodes, according to various embodiments of the present invention. Although the method steps are described in conjunction with the systems of FIGS. 1-3C, persons skilled in the art will understand that any system configured to perform the method steps, in any order, is within the scope of the present invention.

As shown, a method 400 begins at step 402, where a first node generates metrology data during a first time interval. The first node could be, for example, a smart meter configured to measure electricity consumption. The first node is powered by batteries and therefore performs various techniques to conserve battery power. Mesh server 130 configures the duration of the first time interval based on customer preferences, among other possibilities.

At step 404, the first node analyzes a communication schedule to determine that a second node is scheduled to communicate with mesh server 130 across a cellular link 114 at a first communication time, T0. The second node also performs step 404 to determine that the cellular link 114 should be established at time T0. The second node may reside adjacent to the first node or across mesh network 110(1) by any number of hops. Because mesh links 116 are low latency links, the first node can communicate with the second node via mesh network 110(1) with low latency without a significant dependency on the hop separation of the first and second nodes.

At step 406, the first node 112, determines that time T0 begins within a threshold time span. The first node 112 waits until time T0 begins within the threshold time span in order to maximize the amount of metrology data that can be collected and minimize the amount of time one or more mesh links 116 between the first and second node need to be active.

At step 408, the first node establishes a secure mesh link with the second node across mesh network 110(1). For example, the first node could establish IP-based communications with the second node via one or more intermediate mesh links 116. In embodiments where the data generated at step 402 includes non-sensitive information, the first node may skip step 408.

At step 410, the first node transmits the metrology data generated at step 402 to the second node to cause the second node to transmit the metrology data via the cellular link at time T0. Many other nodes 112 can perform steps 402, 404, 406, 408, and 410 of the method 400 in conjunction with the first node in order to channel metrology data to the second node, as well. In this manner, many nodes 112 can avoid needing to establish a cellular link 114 by piggybacking communications on the cellular link 114 established by the second node.

At step 412, the second node determines that time T0 has arrived. As mentioned, the second node also analyzes the communication schedule to determine that the cellular link 114 should be established at time T0. At step 414, the second node stablishes the cellular link 114 at time T0. In one embodiment, the second node initially establishes the cellular link 114 with carrier server 120 and then informs carrier server 120 that the cellular link 114 may temporarily become inactive. This approach reduces the latency with which the cellular link 114 can be reestablished. At step 416, the second node uploads the metrology data that was collected from the first node via the cellular link 114. The second node can also upload metrology data collected by the second node and/or other metrology data collected by other nodes 112.

As a general matter, each node 112 included in hybrid network 110 is configured to perform the method 400. However, depending on various circumstances, any given node 112 may perform only a subset of the steps of the method 400 at any given time. For example, when a given node 112 is not scheduled to subsequently establish a cellular link 114, the given node 112 would perform steps 402, 404, 406, 408, and 410. Alternatively, when a given node 112 is scheduled to subsequently establish a cellular link 114, the given node 112 would perform steps 404, 412, 414, and 416.

Referring generally to FIGS. 3A-4, the disclosed approach permits nodes 112 to provide metrology data to mesh server 130 over arbitrarily short intervals without needing to frequently establish power-hungry cellular links individually. In practice, nodes 112 can be configured to report metrology data as frequently or as infrequently as desired independently of how often cellular links 114 are established. For example, a different node 112 could be configured to establish a cellular link 114 at each different hour of a 24-hour period, though metrology data need only be reported every six hours. This approach can further reduce power consumption. In various embodiments, a given node 112 can establish a cellular link 114 outside of a scheduled communication time in response to an alarm condition in order to report emergent situations to mesh server 130. Each node 112 can perform another technique in order to allow mesh server 130 to issue on-demand read requests to individual nodes 112, as described in greater detail below in conjunction with FIGS. 5A-6.

Leveraging a Wireless Mesh Network to Support On-Demand Read Access

Figure 5A:
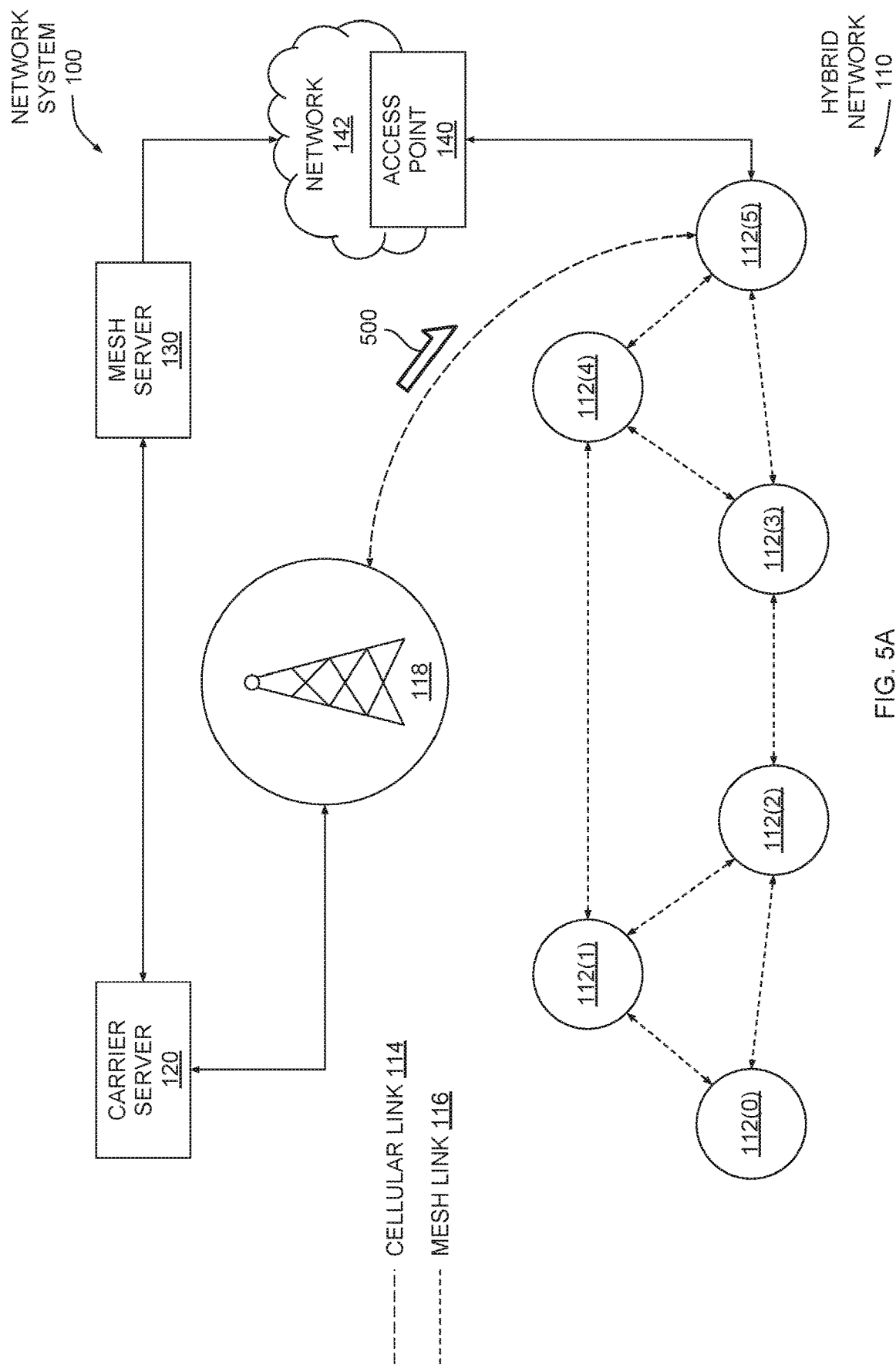
Figure 5C:
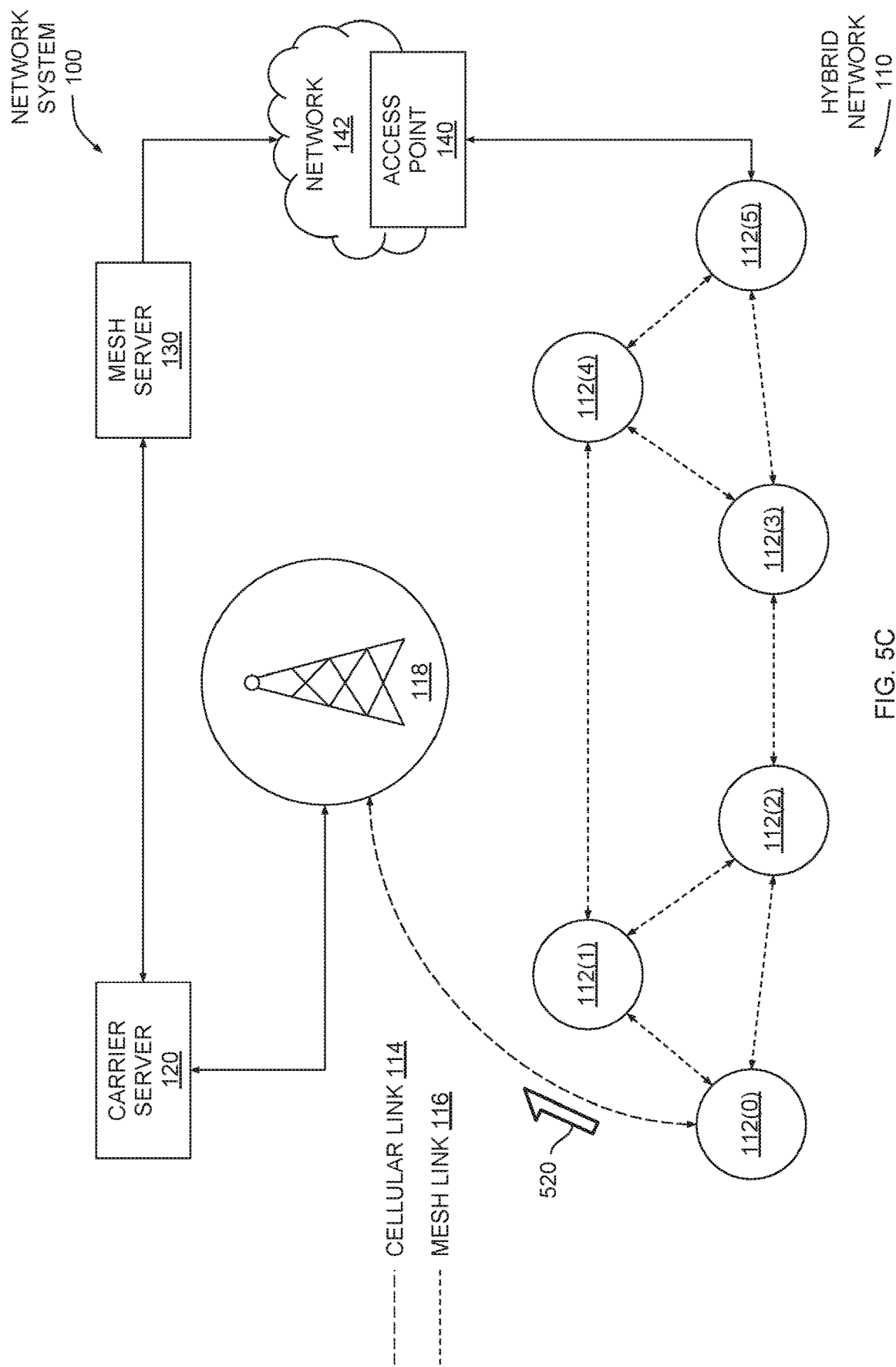

FIGS. 5A-5C illustrate how the nodes of FIG. 1 interoperate to process an on-demand read request, according to various embodiments of the present invention. Under certain circumstances, mesh server 130 may need to read metrology data from an individual node 112 outside of the normal metrology reporting intervals discussed above in conjunction with FIGS. 3A-4. For example, mesh server 130 could need to determine a final meter reading at a residence that was recently sold in order to issue a final utility bill to the seller of the residence. Nodes 112 implement the techniques described below to service on-demand read requests.

As shown in FIG. 5A, node 112(5) establishes a cellular link 114 that allows node 112(5) to communicate with mesh server 130 via carrier server 120. Mesh server 130 transmits an on-demand read request 500 to node 112(5) via cellular link 114. On-demand read request 500 can target any node 112 included in hybrid network 110. In the example described herein, on-demand read request targets node 112 (0). On-demand read request 500 includes instructions indicating that node 112(0) should establish a cellular link 114 to communicate with mesh server 130. Node 112(5) processes on-demand read request 500 to identify node 112(0) and then generates a short message 510 that includes instructions for node 112(0). Short message 510 includes the MAC address of node 112(0) and a "call home" instruction.

As shown in FIG. 5B, node 112(5) transmits short message 510 across mesh network 110(1) to node 112(0) via intermediate nodes 112(3) and 112(2). Each intermediate node 112 parses short message 510 to extract the MAC address portion, and then forwards short message 510 along an appropriate route to node 112(0) based on the MAC address. In practice, short message 510 need not be encrypted because short message 510 does not include sensitive data. Not encrypting short messages such as short message 510 can reduce power consumption because establishing secure mesh links 116 consumes additional power. Nonetheless, in various embodiments, short messages can be transmitted in encrypted form as needed. In some embodiments, nodes 112 simply forward on-demand read requests to recipients instead of sending short messages 510.

As shown in FIG. 5C, upon receipt of short message 510, node 112(0) establishes a cellular link 114 and transmits metrology data 520 to mesh server 130 via cellular tower 118 and carrier server 120. Node 112(0) can then terminate cellular link 114. According to these techniques, nodes 112 interoperate to generate communication pathways that span hybrid network 110 and include both cellular links 114 and mesh links 116 for the purpose of servicing on-demand read requests.

In one embodiment, a given node 112 targeted by an on-demand read request may not be able to establish a cellular link 114 due to interference or other factors. When such a situation occurs, the given node 112 may cause another node 112 to service the on-demand read request on behalf of the given node 112. For example, node 112(0) described above could be unable to establish cellular link 114. Node 112(0) could then send metrology data to node 112(5) to be uploaded across the already-established cellular link 114.

As a general matter, the techniques described in conjunction with FIGS. 5A-5C can be applied to cause nodes 112 to perform any technically feasible operation beyond servicing on-demand read requests, as well. For example, mesh server 130 could transmit a firmware update to node 112(5) when node 112(5) establishes cellular link 114. Node 112(5) could then distribute this firmware update across mesh network 110(0) to each other node 112.

Importantly, these techniques allow nodes 112 to operate in a very responsive manner because mesh server 130 can communicate with any specific node 112 when any node 112 establishes a cellular link 114. In addition, this approach can be scaled to provide more frequent intervals during which mesh server 130 can communicate directly with specific nodes 112. For example, if mesh server 130 configures nodes 112 with a communication schedule that causes nodes 112 to establish a cellular link 114 at 20-minute intervals, then mesh server 130 could issue on-demand read requests to be serviced every 20 minutes, if needed.

Figure 6:
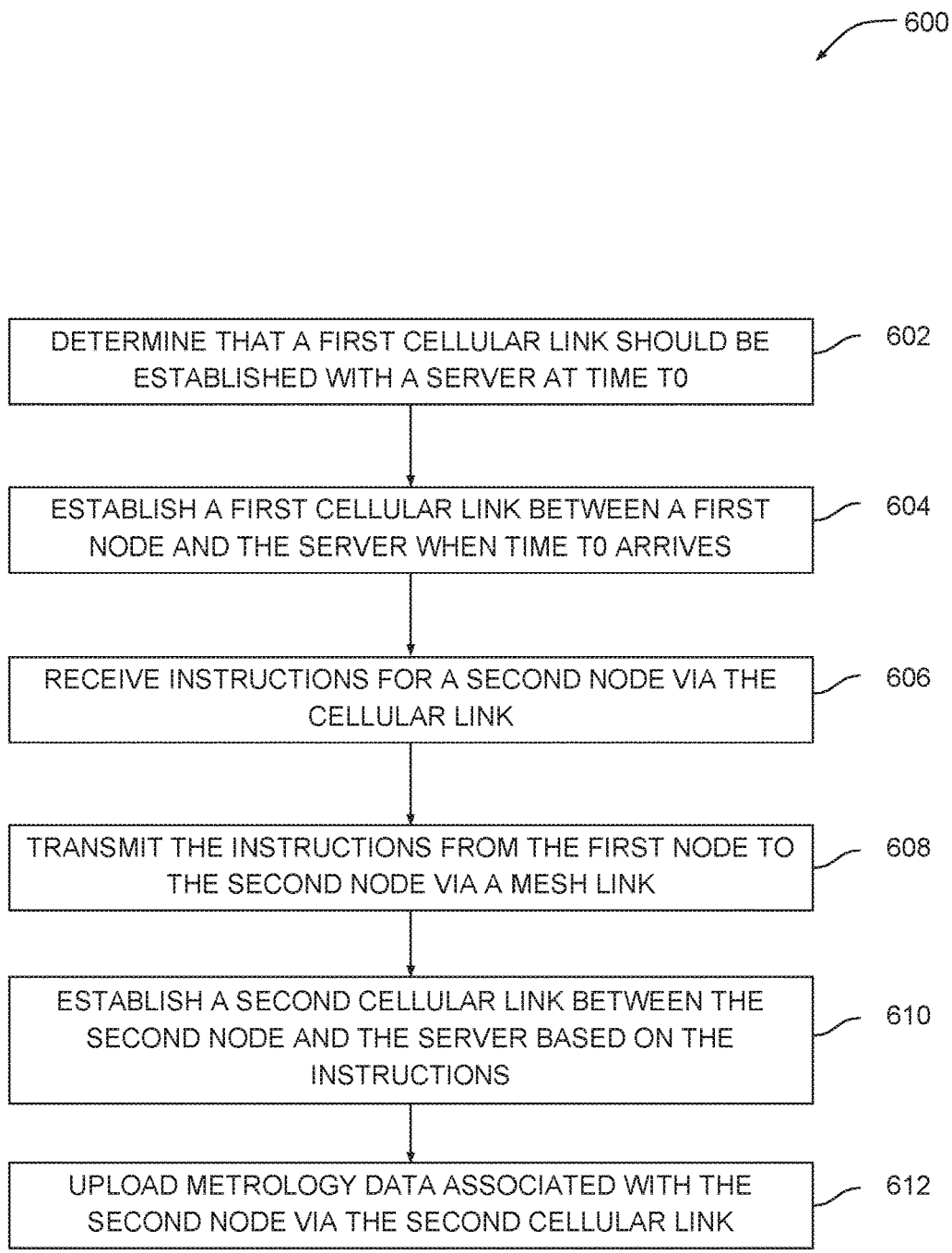
FIG. 6 is a flow diagram of method steps for causing a node to respond to an on-demand read request, according to various embodiments of the present invention.

FIG. 6 is a flow diagram of method steps for causing a node to respond to an on-demand read request, according to various embodiments of the present invention. Although the method steps are described in conjunction with the systems of FIGS. 1-5C, persons skilled in the art will understand that any system configured to perform the method steps, in any order, is within the scope of the present invention.

As shown, a method 600 begins at step 602, where a first node analyzes a communication schedule to determine that a first cellular link should be established with mesh server 130 at a first communication time, T0. Mesh server 130 generally configures nodes 112 to operate according to the same communication schedule in order to permit those nodes to coordinate communications. The communication schedule includes a list of MAC addresses associated with nodes 112 and specific times or intervals when each corresponding node should establish a cellular link 114.

At step 604, the first node 112 establishes the first cellular link when time T0 arrives. In one embodiment, the first node 112 establishes a cellular link 114 when initially activated and then indicates to carrier server 120 that the cellular link 114 may become temporarily inactive. This approach allows the first node 112 to deactivate the cellular link 114 without carrier server 120 rescinding authorization for node 112 to re-activate that cellular link. Accordingly, when the first communication time arrives, the first node 112 may be able to establish the first cellular link very quickly.

At step 606, the first node receives instructions via the first cellular link for a second node. The instructions could indicate, for example, that the second node should service an on-demand read request. Alternatively, the instructions could indicate that the second node should perform any other technically feasible operation. In one embodiment, if the second node fails to establish a cellular link 114 at the scheduled time, then mesh server 130 may transmit instructions to the first node indicating that the second node should service a status update request.

At step 608, the first node transmits the instructions received at step 606 across mesh network 110(1) to the second node. In one embodiment, the first node 112 may only establish one or more mesh links 116 coupling the first node to the second node upon receipt of instructions for the second node. Any number of needed intermediate nodes 112 can forward the instructions across mesh network 110(1).

At step 610, the second node establishes a second cellular link based on the instructions transmitted to the second node at step 608. The instructions typically include an on-demand read request indicating that the second node should establish a cellular link 114 to report metrology data to mesh server 130. In response, at step 612, the second node establishes the second cellular link and uploads metrology data to mesh server 130.

As a general matter, each node 112 included in hybrid network 110 is configured to perform the method 600. Depending on various circumstances, though, any given node 112 may perform only a subset of the steps of the method 600 at any given time. For example, when a given node 112 is scheduled to subsequently establish a cellular link 114, the given node 112 would perform steps 602, 604, 606, and 608. Alternatively, when a given node 112 is not scheduled to subsequently establish a cellular link 114, the given node 112 could perform steps 610 and 612 in response to receiving instructions from another node. Advantageously, implementing the method 600 allows nodes 112 to establish cellular links 114 sparingly yet still retain the ability to communicate with mesh server 130 in an on-demand manner and with very low latency.

In sum, a plurality of nodes included in a hybrid network establishes cellular links with a cellular network and establishes one or more mesh links with a wireless mesh network. Each node can communicate with other nodes included in the hybrid network via low latency and low power mesh links associated with the wireless mesh network. Each node can also communicate with a back office that manages the hybrid network across a secure, IP-based cellular link.

Nodes included in the hybrid network establish cellular links infrequently and at staggered intervals. When a given node establishes a cellular link, other nodes can transmit and receive data to the back office using that cellular link. In particular, the given node accumulates metrology data from the other nodes across the wireless mesh network and then report this metrology data to the back office across the cellular network. In addition, the given node can receive a request from the back office across the cellular link indicating that another node should respond to an on-demand read request. The given node can then signal the other node via the wireless mesh network to establish a cellular link in order to respond to the in-demand read request across the cellular network.

One technological advantage of the disclosed techniques relative to the prior art is that a battery powered node can communicate with the back office as often as needed without having to establish a cellular link frequently or having to maintain a continuously active cellular link. The battery powered node thus conserves battery power and can operate for extended periods of time without needing replacement batteries. In addition, the disclosed techniques enable a battery powered node to communicate with the back office securely and with low latency. These technological advantages represent one or more technological advancements relative to prior art approaches.

1. Some embodiments include a computer-implemented method for servicing read requests within a hybrid network, the method comprising receiving a first read request from a first server via a first communication link, wherein the first communication link comprises a first type of communication link, determining that the first read request is directed to a first node included in the hybrid network, generating a second communication link that couples the first node to a second node also included in the hybrid network, wherein the second communication link comprises a second type of communication link, and transmitting the first read request to the first node via the second communication link to allow the first node to service the first read request.

2. The computer-implemented method of clause 1, further comprising, in response to receiving the first read request, generating a third communication link that couples the first node to the first server, wherein the third communication link comprises the first type of communication link.

3. The computer-implemented method of any of clauses 1-2, further comprising uploading metrology data associated with a current time interval to the first server via the third communication link to service the first read request.

4. The computer-implemented method of any of clauses 1-3, wherein the first node is unable to establish the first type of communication link, and further comprising transmitting metrology data associated with a current time interval to the second node via the second communication link, wherein the second node uploads the metrology data to the first server via the first communication link to service the first read request.

5. The computer-implemented method of any of clauses 1-4, wherein generating the second communication link comprises establishing a first mesh link with at least one adjacent node, wherein the at least one adjacent node either comprises the first node or is coupled to the first node by one or more other mesh links.

6. The computer-implemented method of any of clauses 1-5, further comprising generating the first communication link at a first communication time based on a schedule generated by the first server.

7. The computer-implemented method of any of clauses 1-6, wherein the first type of communication link comprises a cellular network link, and the second type of communication link comprises a mesh network link.

8. The computer-implemented method of any of clauses 1-7, wherein the second node consumes a first amount of power over a first time interval to generate the first communication link, and the second node consumes a second amount of power over the first time interval to generate the second communication link, and wherein the first amount of power is greater than the second amount of power.

9. The computer-implemented method of any of clauses 1-8, wherein the hybrid network includes a first network associated with the first type of communication link and a second network associated with the second type of communication link.

10. The computer-implemented method of any of clauses 1-9, wherein each of the first node and the second node comprises a low power node, a battery powered node, or a solar powered node.

11. Some embodiments include a non-transitory computer-readable medium storing program instructions that, when executed by a processor, causes the processor to service read requests within a hybrid network by performing the steps of receiving a first read request from a first server via a first communication link, wherein the first communication link comprises a first type of communication link, determining that the first read request is directed to a first node included in the hybrid network, generating a second communication link that couples the first node to a second node also included in the hybrid network, wherein the second communication link comprises a second type of communication link, and transmitting the first read request to the first node via the second communication link to allow the first node to service the first read request.

12. The non-transitory computer-readable medium of clause 11, further comprising the steps of receiving metrology data associated with a current time interval from the first node via the second communication link, and uploading the metrology data to the first server via the first communication link to service the first read request on behalf of the first node.

13. The non-transitory computer-readable medium of any of clauses 11-12, wherein the step of generating the second communication link comprises establishing a first mesh link with at least one adjacent node, wherein the at least one adjacent node either comprises the first node or is coupled to the first node by one or more other mesh links.

14. The non-transitory computer-readable medium of any of clauses 11-13, wherein the first type of communication link comprises a cellular network link, and the second type of communication link comprises a mesh network link.

15. The non-transitory computer-readable medium of any of clauses 11-14, wherein the first type of communication link comprises a satellite network link, and the second type of communication link comprises a WiFi network link.

16. The non-transitory computer-readable medium of any of clauses 11-15, wherein the second node consumes a first amount of power over a first time interval to generate the first communication link, and the second node consumes a second amount of power over the first time interval to generate the second communication link, and wherein the first amount of power is greater than the second amount of power.

17. The non-transitory computer-readable medium of any of clauses 11-16, further comprising the step of generating the first communication link to couple the second node to the first server via a second server, wherein the second server authorizes the second node to establish the first communication link.

18. The computer-implemented method of any of clauses 11-17, wherein the first server is coupled to a second server that relays communications between the first server and the second node.

19. Some embodiments include a system, comprising a first node that resides in a hybrid network and generates first metrology data, and a second node that resides in the hybrid network and performs the steps of receiving a first read request from a first server via a first communication link, wherein the first communication link comprises a first type of communication link, determining that the first read request is directed to the first node, generating a second communication link that couples the first node and the second node, wherein the second communication link comprises a second type of communication link, and transmitting the first read request to the first node via the second communication link, wherein the first node services the first read request by uploading the first metrology data to the first server.

20. The system of clause 19, wherein the first type of communication link comprises a cellular network link, and the second type of communication link comprises a mesh network link.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system," In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for servicing read requests within a hybrid network, the method comprising:
receiving, at a first node included in a plurality of nodes within the hybrid network, a first read request from a first server via a first communication link, wherein the first communication link comprises a first active cellular communication link, wherein the plurality of nodes is configured by the first server to take turns establishing separate active cellular communication links with the first server at staggered time intervals according to a first schedule, wherein the first node establishes a first separate active cellular communication link with the first server at least from a first time to a second time that is after the first time, a second node included in the plurality of nodes establishes a second separate active cellular communication link with the first server at least from the second time to a third time that is after the second time, and a third node included in the plurality of nodes establishes a third separate active cellular communication link with the first server at least from a fourth time that is after the third time to a fifth time that is after the fourth time, and wherein, according to the first schedule, the first separate active cellular communication link, the second separate active cellular communication link, and the third separate active cellular communication link are established with the first server such that one node or a subset of nodes included in the plurality of nodes has a separate active cellular communication link established with the first server at any given time during a first continuous time interval that extends from the first time to the fifth time;
determining that the first read request is directed to the second node;
generating a second communication link that couples the first node to the second node, wherein the second communication link comprises a second type of communication link; and
transmitting a first message associated with the first read request to the second node via the second communication link to allow the second node to service the first read request.

2. The computer-implemented method of claim 1, wherein, in response to receiving the first message from the first node, the second node generates a third communication link that couples the second node to the first server, wherein the third communication link comprises an active cellular communication link.

3. The computer-implemented method of claim 2, wherein the second node uploads metrology data associated with a current time interval to the first server via the third communication link to service the first read request.

4. The computer-implemented method of claim 1, wherein the second node is unable to establish an active cellular communication link, wherein the second node transmits metrology data associated with a current time interval to the first node via the second communication link, and wherein the first node uploads the metrology data to the first server via the first communication link to service the first read request.

5. The computer-implemented method of claim 1, wherein generating the second communication link comprises establishing a first mesh link with at least one adjacent node, wherein the at least one adjacent node either comprises the second node or is coupled to the second node by one or more other mesh links.

6. The computer-implemented method of claim 1, further comprising generating the first communication link at a first communication time based on the first schedule generated by the first server.

7. The computer-implemented method of claim 1, wherein the second type of communication link comprises a mesh network link.

8. The computer-implemented method of claim 1, wherein the first node consumes a first amount of power over a given time interval to generate the first communication link, and the first node consumes a second amount of power over the given time interval to generate the second communication link, and wherein the first amount of power is greater than the second amount of power.

9. The computer-implemented method of claim 1, wherein the hybrid network includes a first network associated with the first active cellular communication link and a second network associated with the second type of communication link.

10. The computer-implemented method of claim 1, wherein each of the first node and the second node comprises a low power node, a battery powered node, or a solar powered node.

11. One or more non-transitory computer-readable media storing program instructions that, when executed by one or more processors, causes the one or more processors to service read requests within a hybrid network by performing the steps of:
receiving, at a first node included in a plurality of nodes within the hybrid network, a first read request from a first server via a first communication link, wherein the first communication link comprises a first active cellular communication link, wherein the plurality of nodes is configured by the first server to take turns establishing separate active cellular communication links with the first server at staggered time intervals according to a first schedule, wherein the first node establishes a first separate active cellular communication link with the first server at least from a first time to a second time that is after the first time, a second node included in the plurality of nodes establishes a second separate active cellular communication link with the first server at least from the second time to a third time that is after the second time, and a third node included in the plurality of nodes establishes a third separate active cellular communication link with the first server at least from a fourth time that is after the third time to a fifth time that is after the fourth time, and wherein, according to the first schedule, the first separate active cellular communication link, the second separate active cellular communication link, and the third separate active cellular communication link are established with the first server such that one node or a subset of nodes included in the plurality of nodes has a separate active cellular communication link established with the first server at any given time during a first continuous time interval that extends from the first time to the fifth time;
determining that the first read request is directed to the second node;
generating a second communication link that couples the first node to the second node, wherein the second communication link comprises a second type of communication link; and
transmitting a first message associated with the first read request to the second node via the second communication link to allow the second node to service the first read request.

12. The one or more non-transitory computer-readable media of claim 11, further comprising the steps of:

receiving metrology data associated with a current time interval from the second node via the second communication link; and
uploading the metrology data to the first server via the first communication link to service the first read request on behalf of the second node.

13. The one or more non-transitory computer-readable media of claim 11, wherein the step of generating the second communication link comprises establishing a first mesh link with at least one adjacent node, wherein the at least one adjacent node either comprises the second node or is coupled to the second node by one or more other mesh links.

14. The one or more non-transitory computer-readable media of claim 11, wherein the second type of communication link comprises a mesh network link.

15. The one or more non-transitory computer-readable media of claim 11, wherein the second type of communication link comprises a WiFi network link.

16. The one or more non-transitory computer-readable media of claim 11, wherein the first node consumes a first amount of power over a given time interval to generate the first communication link, and the first node consumes a second amount of power over the given time interval to generate the second communication link, and wherein the first amount of power is greater than the second amount of power.

17. The one or more non-transitory computer-readable media of claim 11, further comprising the step of generating the first communication link to couple the first node to the first server via a second server, wherein the second server authorizes the first node to establish the first communication link.

18. The computer-implemented method of claim 1, wherein the first server is coupled to a second server that relays communications between the first server and the first node.

19. A system, comprising:
a first node included in a plurality of nodes within a hybrid network that generates first metrology data, wherein the plurality of nodes is configured by a first server to take turns establishing separate cellular communication links with the first server at staggered time intervals according to a first schedule, wherein the first node establishes a first separate active cellular communication link with the first server at least from a first time to a second time that is after the first time, a second node included in the plurality of nodes establishes a second separate active cellular communication link with the first server at least from the second time to a third time that is after the second time, and a third node included in the plurality of nodes establishes a third separate active cellular communication link with the first server at least from a fourth time that is after the third time to a fifth time that is after the fourth time, and wherein, according to the first schedule, the first separate active cellular communication link, the second separate active cellular communication link, and the third separate active cellular communication link are established with the first server such that one node or a subset of nodes included in the plurality of nodes has a separate active cellular communication link established with the first server at any given time during a first continuous time interval that extends from the first time to the fifth time; and
a second node included in the plurality of nodes that performs the steps of:

receiving a first read request from the first server via a first communication link, wherein the first communication link comprises an active cellular communication link, determining that the first read request is directed to the first node, generating a second communication link that couples the first node and the second node, wherein the second communication link comprises a second type of communication link, and transmitting a first message associated with the first read request to the first node via the second communication link, wherein the first node services the first read request by uploading the first metrology data to the first server.

20. The system of claim 19, wherein the second type of communication link comprises a mesh network link.

21. The one or more non-transitory computer-readable media of claim 11, wherein each node included in the plurality of nodes is configured by the first server to establish the separate active cellular communication link with the first server at a beginning of a staggered time interval and end the separate active cellular communication link with the first server at an end of the staggered time interval according to the first schedule, where, according to the first schedule, one node included in the plurality of nodes has a separate active cellular communication link established at any given time during the first continuous time interval.

* * * * *